United States Patent
Doi et al.

(10) Patent No.: US 9,019,196 B2
(45) Date of Patent: Apr. 28, 2015

(54) LIQUID CRYSTAL DISPLAY DEVICE

(71) Applicant: Japan Display Inc., Mobara-shi, Chiba-ken (JP)

(72) Inventors: Koji Doi, Chiba (JP); Kouji Hayakawa, Chosei (JP)

(73) Assignee: Japan Display Inc., Tokyo (JP)

( * ) Notice: Subject to any disclaimer, the term of this patent is extended or adjusted under 35 U.S.C. 154(b) by 32 days.

(21) Appl. No.: 13/851,200

(22) Filed: Mar. 27, 2013

(65) Prior Publication Data

US 2013/0293491 A1 Nov. 7, 2013

(30) Foreign Application Priority Data

May 2, 2012 (JP) .................................. 2012-105191

(51) Int. Cl.
- *G09G 3/36* (2006.01)
- *G06F 3/041* (2006.01)
- *G06F 3/044* (2006.01)
- *G02F 1/1333* (2006.01)

(52) U.S. Cl.
CPC .............. *G06F 3/0416* (2013.01); *G06F 3/044* (2013.01); *G02F 1/13338* (2013.01); *G06F 3/0412* (2013.01); *G09G 3/3655* (2013.01)

(58) Field of Classification Search
USPC ............ 345/173–175, 104; 178/18.01–18.07, 178/19.01–19.05
See application file for complete search history.

(56) References Cited

U.S. PATENT DOCUMENTS

| | | | |
|---|---|---|---|
| 2010/0066692 A1* | 3/2010 | Noguchi et al. | 345/173 |
| 2011/0248937 A1 | 10/2011 | Suzuki | |
| 2013/0141377 A1* | 6/2013 | Noguchi et al. | 345/173 |
| 2013/0141379 A1* | 6/2013 | Noguchi et al. | 345/173 |
| 2013/0147746 A1* | 6/2013 | Noguchi et al. | 345/173 |
| 2014/0028625 A1* | 1/2014 | Maeda et al. | 345/174 |
| 2014/0028626 A1* | 1/2014 | Maeda et al. | 345/174 |

FOREIGN PATENT DOCUMENTS

JP 2011-86038 4/2011

* cited by examiner

*Primary Examiner* — Ricardo L Osorio

(74) *Attorney, Agent, or Firm* — Lowe Hauptman & Ham, LLP

(57) ABSTRACT

In a liquid crystal display device, a second substrate has detection electrodes of a touch panel, each of pixels has a pixel electrode and a counter electrode divided into a plurality of blocks. The counter electrodes of the respective blocks are commonly provided for the respective pixels of plural continuous display lines, the counter electrodes of the respective blocks double scanning electrodes of the touch panel, and a driver circuit that applies a counter voltage and a touch panel scanning voltage to the counter electrodes of the respective blocks is provided. The driver circuit sequentially applies the touch panel scanning voltage to the counter electrodes of the respective blocks in plural times, while a drive pulse for displaying an image on a liquid crystal display panel is not varied, and drive frequencies of the respective touch panel scanning voltages are different from each other.

13 Claims, 10 Drawing Sheets

FIG.9

| REGISTER NAME | PARAMETER | RANGE OF VALUE / INTERVAL |
|---|---|---|
| TPC_TXDLY[5:0] | t_txdly | 0 to 18.00 us (0.286 us INTERVALS) |
| TPC_TXMAXD[5:0] | t_txmaxd | 0 to 18.00 us (0.286 us INTERVALS) WHERE t_txdly < t_txmaxd |

_(1)_

LIQUID CRYSTAL DISPLAY DEVICE

CROSS-REFERENCE TO RELATED APPLICATION

The present application claims priority from Japanese application JP2012-105191 filed on May 2, 2012, the content of which is hereby incorporated by reference into this application.

BACKGROUND OF THE INVENTION

1. Field of the Invention

The present invention relates to a liquid crystal display device, and more particularly to a technique effectively applied to an in-cell liquid crystal display device with a built-in touch panel.

2. Description of the Related Art

A display device having a device (hereinafter also referred to as "touch sensor" or "touch panel") that enters information by conducting touch operation (touch pressing operation, hereinafter referred to simply as "touch") on a display screen by the aid of a user's finger or a pen is used for mobile electronic devices such as a PDA or a mobile terminal, a variety of home electric appliances, and automated teller machines.

As the touch panel of this type, there has been known a capacitance type that detects a change in capacitance of a touched portion and is described, for example, in JP2011-86038. As the capacitance type touch panel, there has been known a liquid crystal display device having a so-called in-cell type touch panel in which a touch panel function is incorporated in a liquid crystal display panel. In the in-cell type touch panel, a counter electrode (also called "common electrode") formed on a first substrate (so-called "TFT substrate") configuring the liquid crystal display panel is divided for use as scanning electrodes of the touch panel.

SUMMARY OF THE INVENTION

In a normal touch panel, in order to lessen an influence of a noise source of a terminal having a touch panel mounted thereon on touch detection, a frequency for driving electrodes (scanning electrodes, detection electrodes) of the touch panel is adjusted. JP2011-86038 describes such a case. On the other hand, in the in-cell type touch panel having the touch panel function incorporated in the liquid crystal display panel, in order to avoid an influence of the noise generated from the liquid crystal display panel, the touch panel is scanned at timing when the liquid crystal display panel is not driven with reference to a synchronizing signal of the liquid crystal display panel. For that reason, a drive frequency of the touch panel depends on a drive frequency of the liquid crystal display panel, and cannot be freely adjusted.

The present invention has been made to solve the problems with the related art, and therefore an object of the present invention is to provide a technique in which a drive frequency of a touch panel can be freely adjusted without depending on a drive frequency of a liquid crystal display panel in a liquid crystal display device with a built-in touch panel function.

The above and other objects and novel features of the present invention will become apparent from the description of the present invention and the attached drawings.

An outline of typical features of the invention disclosed in the present specification will be described in brief below.

(1) According to the present invention, there is provided a liquid crystal display device, including: a first substrate; a second substrate having detection electrodes of a touch panel; a liquid crystal held between the first substrate and the second substrate; a plurality of pixels arrayed in a matrix, each having a pixel electrode and a counter electrode divided into a plurality of blocks; and a driver circuit that applies a counter voltage and a touch panel scanning voltage to the divided counter electrodes of the respective blocks, in which the divided counter electrodes of the respective blocks are commonly provided on the respective pixels of a plurality of continuous display lines, in which the divided counter electrodes of the respective blocks double as scanning electrodes of the touch panel, in which if N is an integer of 2 or larger, the driver circuit sequentially applies the touch panel scanning voltage to the divided counter electrodes of the respective blocks in N horizontal scanning periods while a drive pulse for displaying an image is not varied, and in which a drive frequency of the touch panel scanning voltage which is applied to the divided counter electrodes of the respective blocks in the respective periods of the N horizontal scanning periods is different in each of the N horizontal scanning periods.

(2) There is provide the liquid crystal display device according to the item (1), in which the first substrate includes a plurality of video lines that input a video voltage to the respective pixels, and a plurality of scanning lines that input a scanning voltage to the respective pixels, and in which a period during which the drive pulse for displaying the image on a liquid crystal display panel is not varied is a period other than a voltage transition timing point of the video voltage on the video lines, a rising time point of the scanning voltage, or a falling time point of the scanning voltage.

(3) According to the present invention, there is provided a liquid crystal display device, including: a first substrate; a second substrate having detection electrodes of a touch panel; a liquid crystal held between the first substrate and the second substrate; a plurality of pixels arrayed in a matrix, each having a pixel electrode and a counter electrode divided into a plurality of blocks; and a driver circuit that applies a counter voltage and a touch panel scanning voltage to the divided counter electrodes of the respective blocks, in which the divided counter electrodes of the respective blocks are commonly provided on the respective pixels of a plurality of continuous display lines, in which the divided counter electrodes of the respective blocks double as scanning electrodes of the touch panel, in which, if N is an integer of 2 or larger, the driver circuit sequentially applies the touch panel scanning voltage to the divided counter electrodes of the respective blocks in N horizontal scanning periods while a drive pulse for displaying an image is not varied, and in which timing at which the touch panel scanning voltage is applied to the divided counter electrodes of the respective blocks in the respective periods of the N horizontal scanning periods is different in each of the N horizontal scanning periods.

(4) There is provided the liquid crystal display device according to the item 3, in which the first substrate includes a plurality of video lines that input a video voltage to the respective pixels, and a plurality of scanning lines that input a scanning voltage to the respective pixels, and in which a period during which the drive pulse for displaying the image on a liquid crystal display panel is not varied is a period other than a voltage transition timing point of the video voltage on the video lines, a rising time point of the scanning voltage, or a falling time point of the scanning voltage.

(5) According to the present invention, there is provided a liquid crystal display device, including: a first substrate; a second substrate having detection electrodes of a touch panel; a liquid crystal held between the first substrate and the second substrate; a plurality of pixels arrayed in a matrix, each having a pixel electrode and a counter electrode divided into a plurality of blocks; and a driver circuit that applies a counter voltage and a touch panel scanning voltage to the divided counter electrodes of the respective blocks, in which the divided counter electrodes of the respective blocks are commonly provided on the respective pixels of a plurality of continuous display lines, in which the divided counter electrodes of the respective blocks double as scanning electrodes of the touch panel, in which if N is an integer of 2 or larger, the driver circuit sequentially applies the touch panel scanning voltage to the divided counter electrodes of the respective blocks in N horizontal scanning periods while a drive pulse for displaying an image is not varied, and in which a period since a reference time point till a time point when the touch panel scanning voltage is applied to the divided counter electrodes of the respective blocks in the respective periods of the N horizontal scanning periods is different in each of the N horizontal scanning periods.

(6) There is provided the liquid crystal display device according to the item 5, in which the first substrate includes a plurality of scanning lines that input a scanning voltage to the respective pixels, and in which the reference time point is one of a rising time point of the scanning voltage, and a falling time point of the scanning voltage.

(7) There is provided the liquid crystal display device according to the item 5, in which the first substrate includes a plurality of video lines that input a video voltage to the respective pixels, and a plurality of scanning lines that input a scanning voltage to the respective pixels, and in which a period during which the drive pulse for displaying the image on a liquid crystal display panel is not varied is a period other than a voltage transition timing point of the video voltage on the video lines, a rising time point of the scanning voltage, or a falling time point of the scanning voltage.

(8) According to the present invention, there is provided a liquid crystal display device, including: a first substrate; a second substrate having detection electrodes of a touch panel; a liquid crystal held between the first substrate and the second substrate; a plurality of pixels arrayed in a matrix, each having a pixel electrode and a counter electrode divided into a plurality of blocks; and a driver circuit that applies a counter voltage and a touch panel scanning voltage to the divided counter electrodes of the respective blocks, in which the divided counter electrodes of the respective blocks are commonly provided on the respective pixels of a plurality of continuous display lines, in which the divided counter electrodes of the respective blocks double as scanning electrodes of the touch panel, in which if N is an integer of 2 or larger, the driver circuit sequentially applies the touch panel scanning voltage to the divided counter electrodes of the respective blocks in N horizontal scanning periods while a drive pulse for displaying an image on a liquid crystal display panel is not varied, and in which when it is assumed that t_txdly is a unit delay time, t_txwait is a given wait time, n is an integer of 1 or larger and N or smaller, and delay=(n−1)×t_txdl is satisfied, the driver circuit applies the touch panel scanning voltage to the divided counter electrodes of the respective blocks after a period (t_txwait+delay) has been elapsed from a reference time point when applying the touch panel scanning voltage to the divided counter electrodes of the respective blocks in an n-th horizontal scanning period.

(9) There is provided the liquid crystal display device according to the item 8, in which the first substrate includes a plurality of scanning lines that input a scanning voltage to the respective pixels, and in which the reference time point is one of a rising time point of the scanning voltage, and a falling time point of the scanning voltage.

(10) There is provided the liquid crystal display device according to the item 8, in which the driver circuit has a register in which the unit delay time (t_txdly) is stored.

(11) There is provided the liquid crystal display device according to the item 8, in which when it is assumed that t_txmaxd is a maximum delay time, if a delay time "delay" becomes t_txmaxd or larger, the delay time of "delay" is replaced with a delay time of (delay−(n−1)×t_txdly).

(12) There is provided the liquid crystal display device according to the item 11, in which the driver circuit has a register in which the maximum delay time (t_txmaxd) is stored.

(13) There is provided the liquid crystal display device according to the item 8, in which the driver circuit includes: a sequencer; a touch panel scanning voltage generator circuit that generates the touch panel scanning voltage under a control of the sequencer; and a delay circuit that delays the touch panel scanning voltage output from the touch panel scanning voltage generator circuit under the control of the sequencer by a desired delay time.

Advantages obtained by typical features of the invention disclosed in the present application are described in brief below. According to the liquid crystal display device incorporating a touch panel function of the present invention, the drive frequency of the touch panel can be freely adjusted without depending on the drive frequency of the liquid crystal display panel.

BRIEF DESCRIPTION OF THE DRAWINGS

FIG. 9 is a diagram illustrating the specification of two registers according to the embodiment of the present invention.

DETAILED DESCRIPTION OF THE INVENTION

Hereinafter, embodiments of the present invention will be described in detail with reference to the attached drawings. In all of the drawings illustrating the embodiments, parts having the same function are denoted by identical symbols, and its repetitive description will be omitted. Also, the following embodiments do not limit the interpretation of the claims of the present invention.

Figure 1:
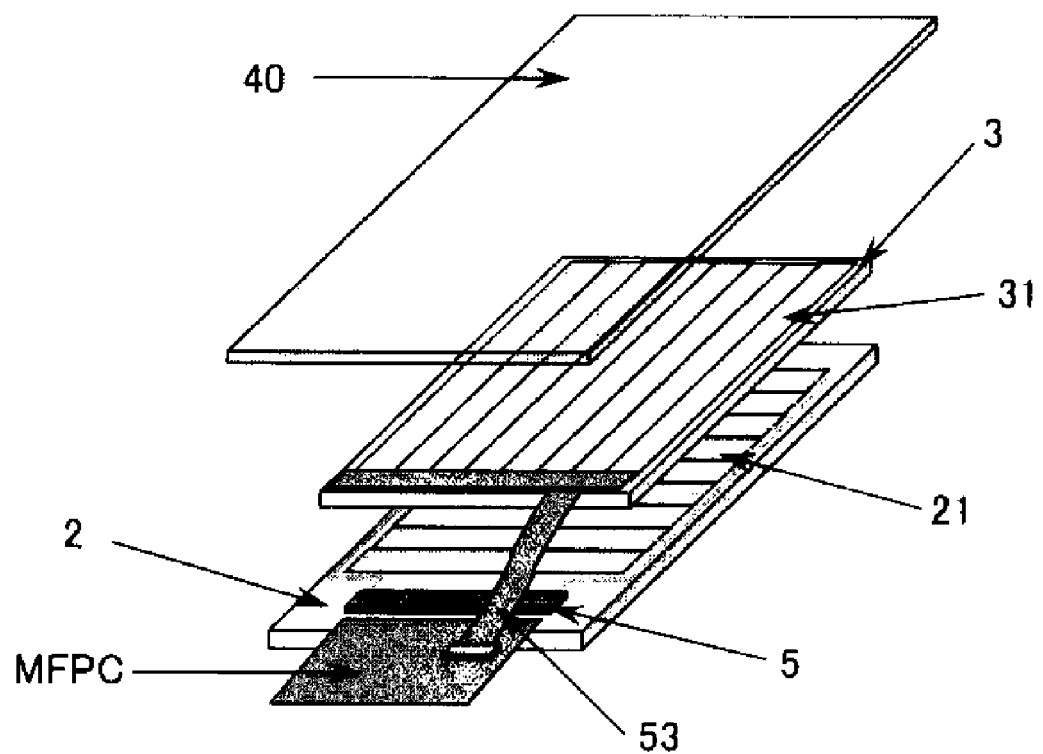
FIG. 1 is an exploded perspective view illustrating an outline configuration of a liquid crystal display device with a built-in touch panel.

FIG. 1 is an exploded perspective view illustrating an outline configuration of a liquid crystal display device with a built-in touch panel in which a touch panel is incorporated into a liquid crystal display panel. As illustrated in FIG. 1, the liquid crystal display device according to the embodiment of the present invention includes a first substrate 2 (hereinafter referred to as "TFT substrate 2"), a second substrate 3 (hereinafter referred to as "CF substrate 3"), a counter electrode 21 (also called "common electrode"), a liquid crystal driver IC 5, a main flexible wiring substrate MFPC, a front window 40, and a connection flexible wiring substrate 53. In the liquid crystal display device illustrated in FIG. 1, a rear surface side transparent conductive film (CD) on the CF substrate 3 is divided into band-like patterns as detection electrodes 31 of the touch panel. The counter electrode 21 formed in the interior of the TFT substrate 2 is divided into band-like patterns, that is, divided into a plurality of blocks to double as scanning electrodes of the touch panel, thereby eliminating a touch panel substrate used in a normal touch panel. Also, in the liquid crystal display device illustrated in FIG. 1, a circuit for driving the touch panel is disposed in the interior of the liquid crystal driver IC 5.

Figure 2:
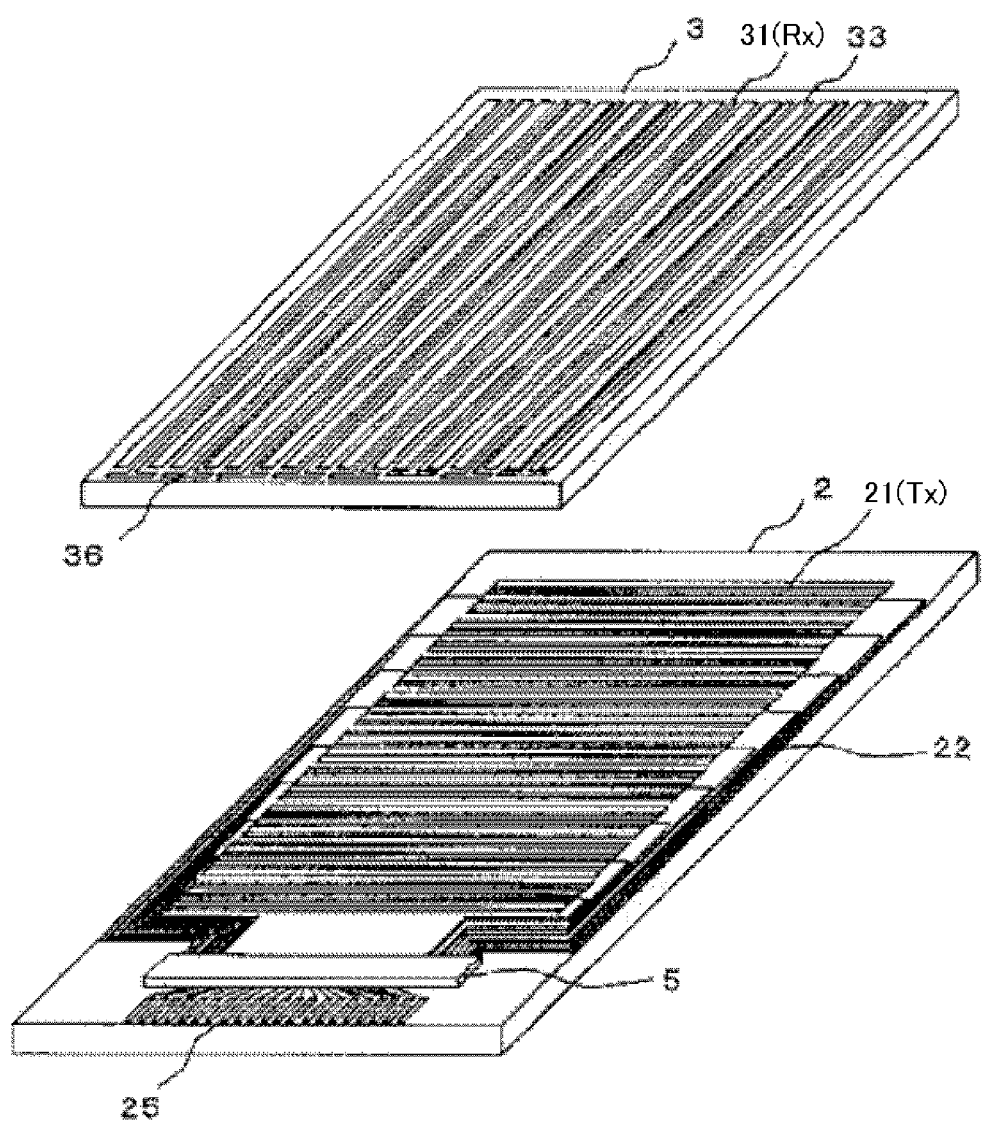
FIG. 2 is a diagram illustrating counter electrode and detection electrodes in the liquid crystal display device with the built-in touch panel illustrated in FIG. 1.

Subsequently, a description will be given of the counter electrode 21 and the detection electrodes 31 in the liquid crystal display device illustrated in FIG. 1, with reference to FIG. 2. As described above, the counter electrode 21 is disposed on the TFT substrate 2, and a plurality (for example, about 32) of counter electrodes 21 are commonly connected at both ends thereof, and connected to counter electrode signal lines 22. In the liquid crystal display device illustrated in FIG. 2, a bundle of the counter electrodes 21 doubles as scanning electrodes (Tx), and the detection electrodes 31 also configure detection electrodes (Rx). Accordingly, a counter electrode signal includes a counter voltage used for image display, and a touch panel scanning voltage used for detection of a touch position. When the touch panel scanning voltage is applied to the counter electrodes 21, a detection signal is generated in the detection electrodes 31 arranged at a given distance from the counter electrodes 21, and configuring a capacitance. The detection signal is extracted to the external through a detection electrode terminal 36. Dummy electrodes 33 are formed on both sides of the detection electrodes 31. The detection electrodes 31 form T-shaped detection electrode terminals 36 which are widened toward the dummy electrodes 33 side, on one end thereof. Also, a variety of lines and terminals such as a driver circuit input terminal 25 are formed on the TFT substrate 2 except for the counter electrode signal lines 22.

Figure 3:
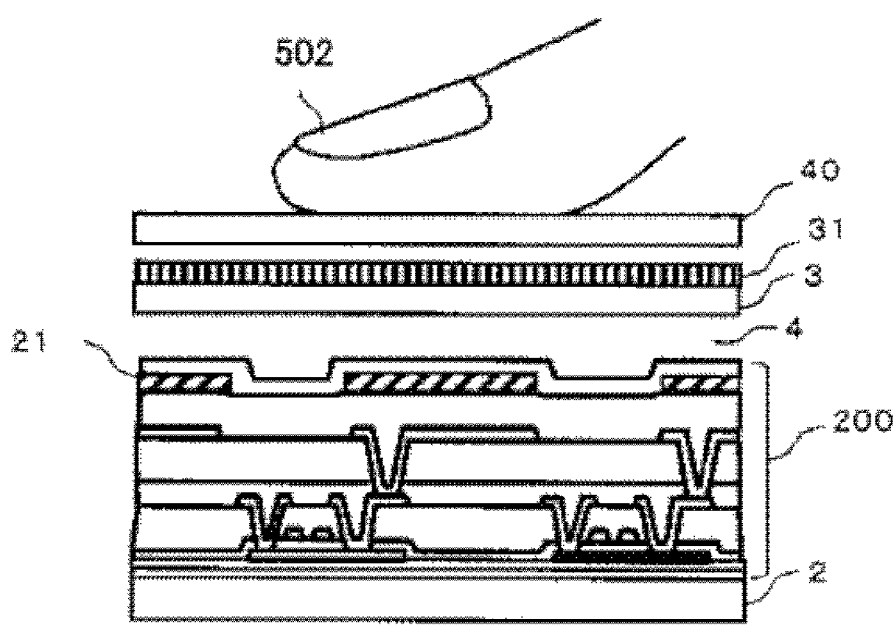
FIG. 3 is a schematic cross-sectional view partially enlarging a cross-section of a display portion in the liquid crystal display device with the built-in touch panel illustrated in FIG. 1.

FIG. 3 is a schematic cross-sectional view partially enlarging a cross-section of a display portion in the liquid crystal display device illustrated in FIG. 1. As illustrated in FIG. 3, a pixel portion 200 is formed on the TFT substrate 2, and the counter electrodes 21 are used for image display as a part of pixels. Also, a liquid crystal composition 4 is held between the TFT substrate 2 and the CF substrate 3. The detection electrodes 31 formed on the CF substrate 3 and the counter electrodes 21 formed on the TFT substrate 2 form capacitances therebetween. When a drive signal is supplied to each of the counter electrodes 21, a voltage across the corresponding detection electrodes 31 is changed. In this situation, as illustrated in FIG. 3, when an electric conductor such as a finger 502 comes in proximity to or in contact with the detection electrodes 31 through the front window 40, a capacitance is changed, and the voltage across the detection electrodes 31 is changed as compared with a case in which there is no proximity or contact of the electric conductor. Thus, the change in the capacitance occurring between the counter electrodes 21 and the detection electrodes 31 formed in the liquid crystal display panel is detected, to enable the function of the touch panel to be provided in the liquid crystal display panel.

Figure 4:
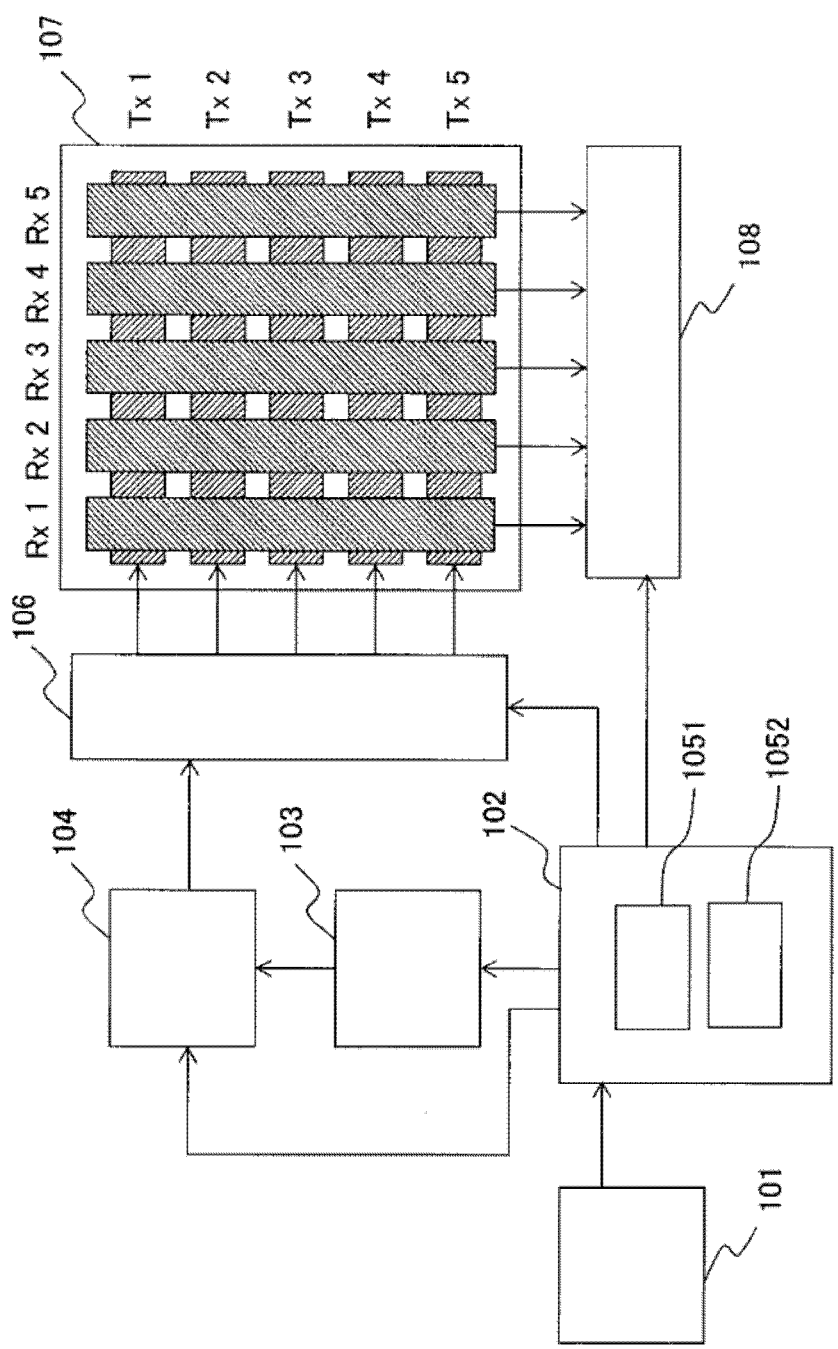
FIG. 4 is a block diagram illustrating an overall outline configuration of the touch panel according to an embodiment of the present invention.

FIG. 4 is a block diagram illustrating an overall outline configuration of the touch panel according to the embodiment of the present invention. As illustrated in FIG. 4, the touch panel according to the embodiment of the present invention includes an LCD driver 101, a sequencer 102, a touch panel scanning voltage generator circuit 103, a delay circuit 104, a decoder circuit 106, a touch panel 107, a detector circuit 108, a register 1051, and a register 1052. On the touch panel 107 is formed an electrode pattern (scanning electrodes of Tx1 to Tx5, detection electrodes of Rx1 to Rx5) which are sensor terminals for detecting touch by a user. In this embodiment, because of an in-cell type touch panel in which the touch panel function is incorporated into the liquid crystal display panel, the bundle of counter electrodes 21 illustrated in FIG. 2 double the scanning electrodes (Tx), and the detection electrodes 31 configure the detection electrodes (Rx). The LCD driver 101 transmits synchronizing signals (a vertical synchronizing signal (Vsync) and a horizontal synchronizing signal (Hsync)) for displaying an image on the liquid crystal display panel to the sequencer 102. The sequencer 102 controls the touch panel scanning voltage generator circuit 103, the delay circuit 104, the decoder circuit 106, and the detector circuit 108 to control the timing of the touch detection operation. The touch panel scanning voltage generator circuit 103 generates and outputs a touch panel scanning voltage (Vstc) for driving the scanning electrodes of Tx1 to Tx5.

The delay circuit 104 delays the touch panel scanning voltage (Vstc) input from the touch panel scanning voltage generator circuit 103 by the amount of delay instructed from the sequencer 102. The sequencer 102 determines the amount of delay on the basis of parameters stored in the registers (1051, 1052). The register 1051 is a register that stores a unit delay time, and the register 1052 is a register that stores a maximum delay time. The unit delay time stored in the register 1051 is a unit time by which the touch panel scanning voltage (Vstc) is delayed, which is a parameter for determining a drive frequency of the touch panel scanning voltage (Vstc). The maximum delay time stored in the register 1052 is a maximum time by which the touch panel scanning voltage (Vstc) is delayed, which is a parameter that defines an allowable range in which the timing of the touch panel scanning voltage (Vstc) is varied. The decoder circuit 106 is an analog switch (demultiplexer) that outputs the touch panel scanning voltage (Vstc) to one scanning electrode among the scanning electrodes of Tx1 to Tx5 on the basis of a select signal input from the sequencer 102. The detector circuit 108 detects inter-electrode capacitances (mutual capacitances) at intersection points of one scanning electrode to which the touch panel scanning voltage (Vstc) is applied among the scanning electrodes of Tx1 to Tx5, and the respective detection electrodes of Rx1 to Rx5.

Figure 5:
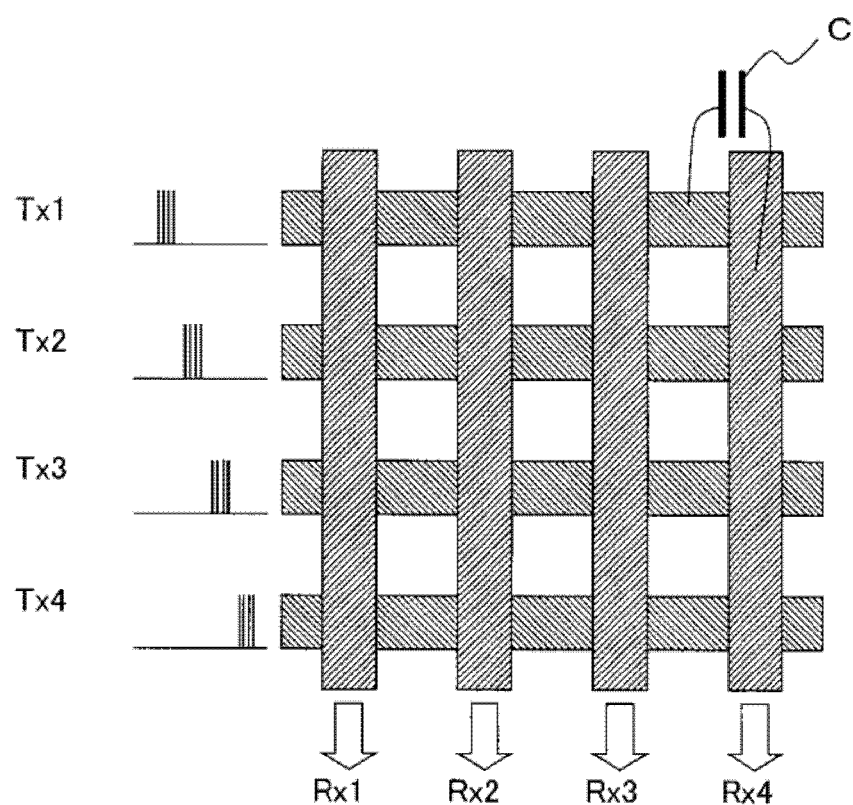
FIG. 5 is a diagram illustrating a detection principle of the touch panel according to the embodiment of the present invention.
Figure 6:
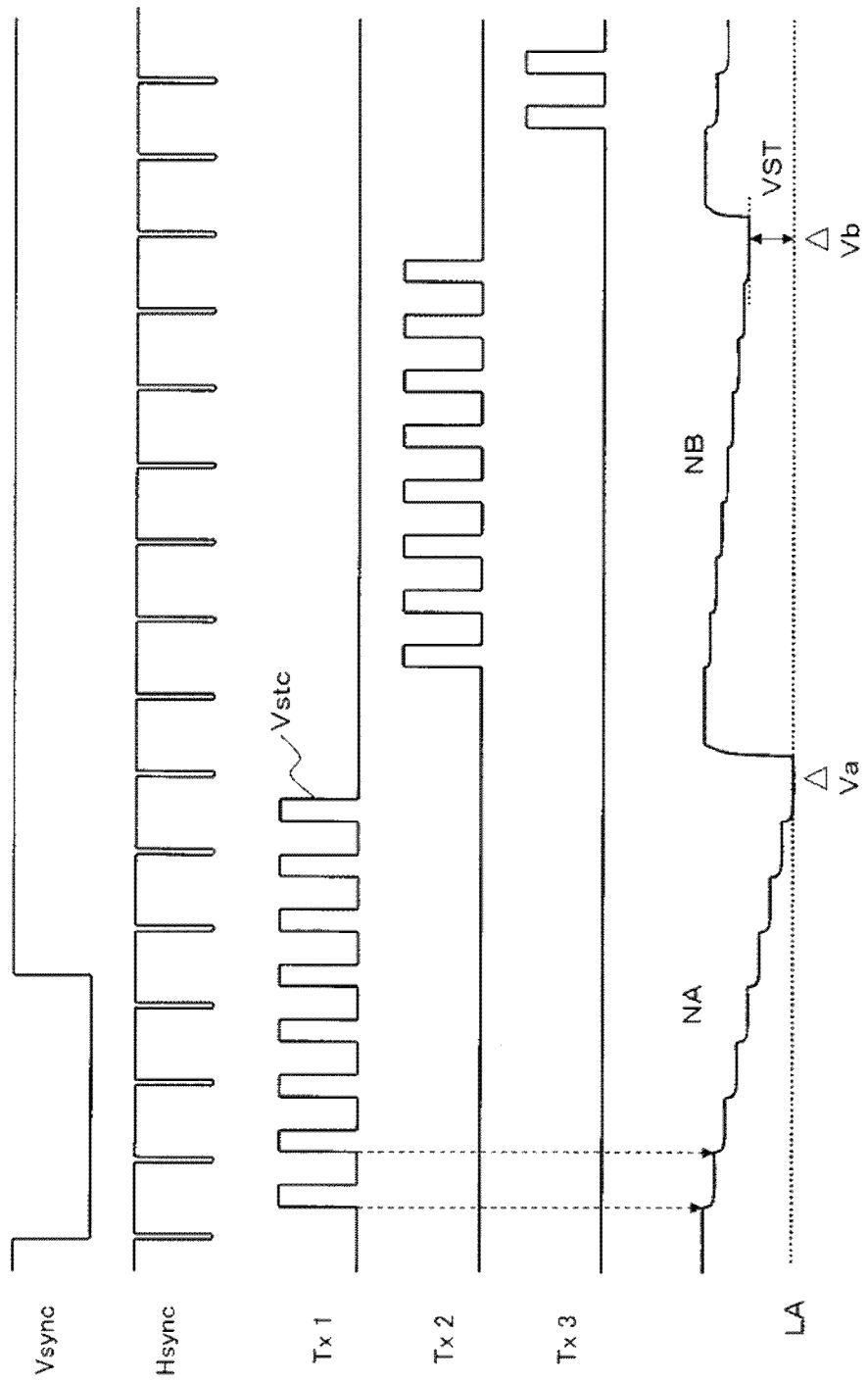
FIG. 6 is a timing chart of a touch detection operation of the touch panel according to the embodiment of the present invention.

FIG. 5 is a diagram illustrating a detection principle of the touch panel according to the embodiment of the present invention. FIG. 6 is a timing chart of the touch detection operation of the touch panel according to the embodiment of the present invention. The sequencer 102 controls the touch panel scanning voltage generator circuit 103, and sequentially applies the touch panel scanning voltage (Vstc) to the scanning electrodes of Tx1 to Tx5 in synchronization with the vertical synchronizing signal (Vsync) and the horizontal synchronizing signal (Hsync). In this example, as illustrated in FIGS. 5 and 6, the touch panel scanning voltage (Vstc) is applied to the respective scanning electrodes in plural times (eight times in FIG. 6). As illustrated in FIG. 6, the detector circuit 108 integrates detection voltages developed in the respective detection electrodes of Rx1 to Rx5 together (integration in a negative direction in FIG. 6), and records an attained voltage value (ΔVa, ΔVb). When a neighborhood of an intersection point between the scanning electrode (Tx) and the detection electrode (Rx) is touched with the finger (conductor), because a current also flows into the finger, a voltage value of the integration result is changed. For example, in FIG. 6, because no finger is present in the vicinity of the intersection point between the scanning electrode (Tx1) and a detection electrode (R×N) (a non-touch state indicated by NA in FIG. 6), a voltage obtained by integrating the detection voltages together becomes a non-touch level (LA). On the contrary, because the finger is present in the vicinity of the intersection point between the scanning electrode (Tx2) and the detection electrode (R×N) (a touch state indicated by NB in FIG. 6), the current also flows into the finger, and a voltage obtained by integrating the detection voltages together becomes a voltage of higher potential than that in the non-touch level (LA). The touch position can be detected according to the amount of change (touch signal).

Figure 7:
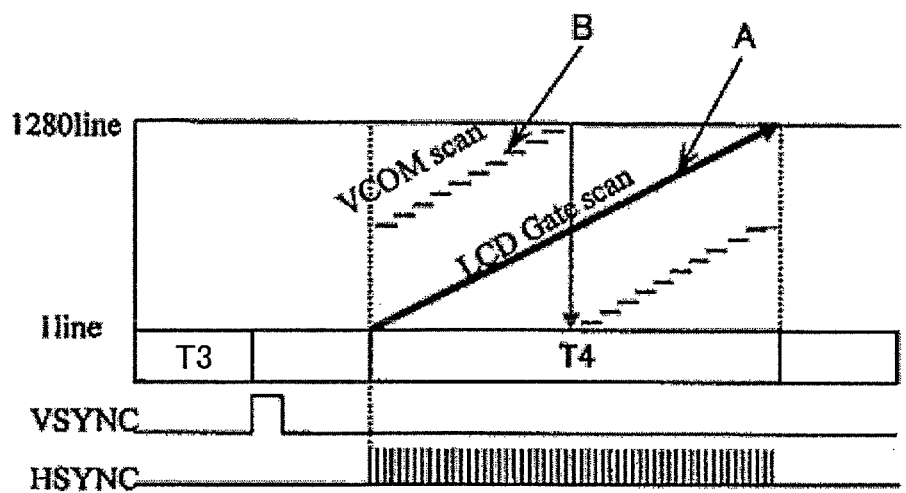
FIG. 7 is a diagram illustrating timing of touch panel detection and pixel writing in the liquid crystal display device with the built-in touch panel.

FIG. 7 is a diagram illustrating timing of touch panel detection and pixel writing in the liquid crystal display device with the built-in touch panel. Referring to FIG. 7, T3 is a flyback period, VSYNC is the vertical synchronizing signal, and HSYNC is the horizontal synchronizing signal. Symbol A in FIG. 7 indicates pixel write timing from a first display line to 1280th display line in a pixel write period (T4) of one frame, and symbol B in FIG. 7B indicates touch panel detection timing in the counter electrodes (CT1 to CT20) of the respective blocks divided into 20 blocks. As illustrated in FIG. 7, the counter electrode of an arbitrary display line is allowed to function as the scanning electrode (Tx), and the scanning operation at the time of the touch panel detection is conducted at a location different from that in which gate scan for writing the pixel is conducted. As illustrated in FIG. 7, the gate scan and the touch panel scan are implemented on different display lines. However, because parasitic capacitances are present between each video line and the counter electrode (CT), and between each scanning line and the counter electrode (CT), a detection sensitivity at the time of the touch panel detection is lessened by a variation in a voltage (VDL) on the video line, or noise occurring at the time of rising or falling of a scanning voltage (VGL). Under the circumstances, in this embodiment, the touch position detection operation is executed in a period when there is no variation in the voltage (VDL) on the video line, or there is no rising or falling of the scanning voltage (VGL).

Figure 8:
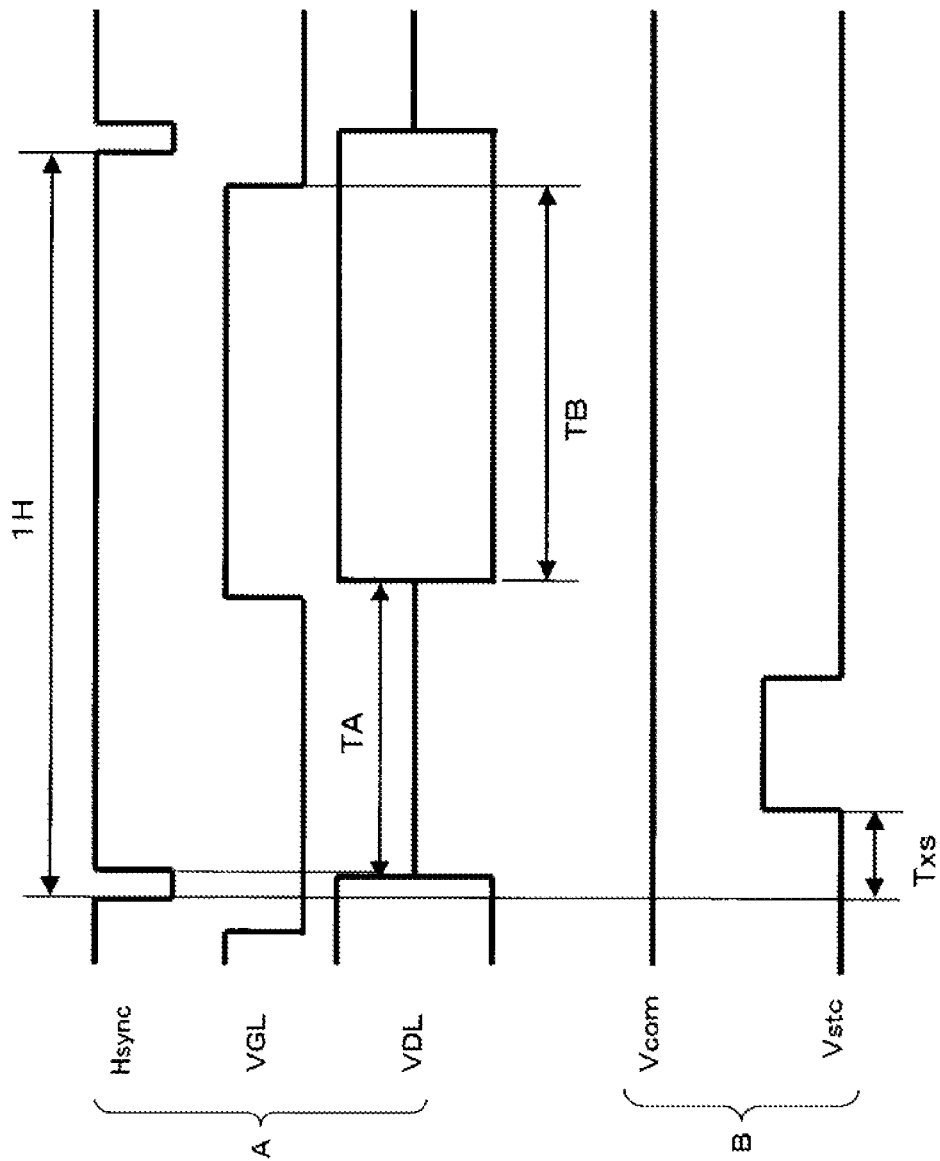
FIG. 8 is a timing chart of liquid crystal display panel drive and sensor electrode drive in the liquid crystal display device according to the embodiment of the present invention.

FIG. 8 is a timing chart of the liquid crystal display panel drive and the sensor electrode drive in the liquid crystal display device according to the embodiment of the present invention. Referring to FIG. 8, VGL is the scanning voltage on the scanning line, VDL is the video voltage on the video line, Vcom is a counter voltage (also called "common voltage") which is applied to the counter electrode, Vstc is the touch panel scanning voltage, 1H is one horizontal scanning period, and Txs is a touch panel scanning start wait period. In the liquid crystal display device according to this embodiment, since dot inversion is applied as an AC drive method, the counter voltage is a voltage of Vcom having a given potential. In the in-cell type touch panel in which the touch panel function is incorporated into the liquid crystal display panel, because the bundle of counter electrodes 21 illustrated in FIG. 2 also operates as the scanning electrode (Tx) for touch detection, the display operation (A in FIG. 8) of the liquid crystal display panel and the touch position detection operation (B in FIG. 8) are completely time-shared, and a synchronization control needs to be conducted. As described above, in this embodiment, the touch position detection operation is executed in a period (a period of TA or a period of TB in FIG. 8) when there is no variation in the voltage (VDL) on the video line, or there is no rising or falling of the scanning voltage (VGL).

FIG. 9 is a diagram illustrating the specification of the register 1051 and the register 1052 according to the embodiment of the present invention. A register whose register name illustrated in FIG. 9 is "TCP_TXDLY" is the register 1051 illustrated in FIG. 4, in which the parameter is "unit delay time (t_txdly)", and the unit delay time is set 0 to 18.0 us at intervals of 0.286 us. Also, a register of "TCP_TXMAXD" illustrated in FIG. 9 is the register 1052 illustrated in FIG. 4, in which the parameter is "maximum delay time (t_txmaxd)", and the maximum delay time is set 0 to 18.0 us at intervals of 0.286 us. In this case, a condition of t_txdly<t_txmaxd needs to be satisfied.

Figure 10:
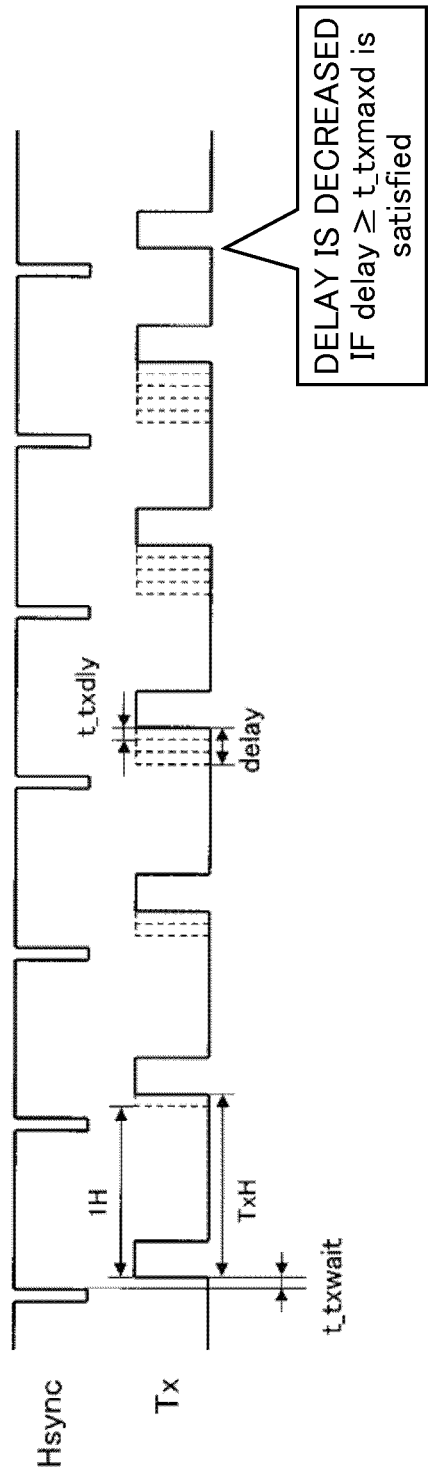
FIG. 10 is a diagram illustrating touch panel scanning timing according to the embodiment of the present invention.

FIG. 10 is a diagram illustrating the touch panel scanning timing according to the embodiment of the present invention. Referring to FIG. 10, 1H is one horizontal scanning period, and TxH is a touch panel scanning period. In this embodiment, when the touch panel scanning voltage (Vstc) is applied to the same scanning electrode (Tx) over a plurality of horizontal scanning periods in plural times (for example, 32 times), timing at which the touch panel scanning voltage (Vstc) is applied to the scanning electrode (Tx) is delayed by the unit delay time stored in the register 1051 every one horizontal scanning period. The delay time does not exceed the maximum delay time stored in the register 1052.

In this embodiment, as illustrated in FIG. 10, in a first horizontal scanning period, the timing at which the touch panel scanning voltage (Vstc) is applied to the scanning electrode (Tx), is a time point after a given wait time (t_txwait) has been elapsed from a rising time point of the horizontal synchronizing signal (Hsync). In a second horizontal scanning period, the timing at which the touch panel scanning voltage (Vstc) is applied to the scanning electrode (Tx), is a time point (t_txwait+t_txdly) after a period obtained by adding the unit delay time (t_txdly) to the given wait time (t_txwait) has been elapsed from the rising time point of the horizontal synchronizing signal (Hsync). In an n-th (0≤n≤31) horizontal scanning period, the timing at which the touch panel scanning voltage (Vstc) is applied to the scanning electrode (Tx), is a time point (t_txwait+nxt_txdly) after a period obtained by adding an n×unit delay time (nxt_txdly) to the given wait time (t_txwait) has been elapsed from the rising time point of the horizontal synchronizing signal (Hsync). Thus, in this embodiment, when the touch panel scanning voltage (Vstc) is applied to the same scanning electrode (Tx) over a plurality of horizontal scanning periods in plural times (for example, 32 times), timing at which the touch panel scanning voltage (Vstc) is applied to the scanning electrode (Tx) in the n-th (0≤n≤31) horizontal scanning period is represented by (t_txwait+delay; delay=nxt_txdly). Then, when (nxt_txdly) is equal to or larger than the maximum delay time (t_txmaxd) (nxt_txdly≥t_txmaxd), the timing is represented by (delay=delay−nxt_txdly).

Hereinafter, an setting example of the register (TPC_TXDLY) 1051 and register (TPC_TXMAXD) 1052 will be described.

If touch panel scanning period (T×H)>one horizontal scanning period (1H),
(Example 1) register (TPC_TXDLY)=1, and register (TPC_TXMAXD)=5 The number of delays=0, 1, 2, 3, 4, 0, 1, ...
(Example 2) register (TPC_TXDLY)=2, and register (TPC_TXMAXD)=5 The number of delays=0, 2, 4, 1, 3, 0, 2, ...

If touch panel scanning period (T×H)<one horizontal scanning period (1H),
(Example 3) register (TPC_TXDLY)=9, and register (TPC_TXMAXD)=10 The number of delays=0, 9, 8, 7, 6, 5, 4, 3, 2, 1, 0, 9, ...

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device, comprising:
a first substrate;
a second substrate having detection electrodes of a touch panel;
a liquid crystal held between the first substrate and the second substrate;
a plurality of pixels arrayed in a matrix, each having a pixel electrode and a counter electrode divided into a plurality of blocks; and
a driver circuit that applies a counter voltage, a scanning voltage, a video voltage and a touch panel scanning voltage to the divided counter electrodes of the respective blocks,
wherein the divided counter electrodes of the respective blocks are commonly provided on the respective pixels of a plurality of continuous display lines,
wherein the divided counter electrodes of the respective blocks double as scanning electrodes of the touch panel,
wherein, in respective horizontal scanning periods, the driver circuit outputs the scanning voltage, the video voltage and the touch panel scanning voltage,
wherein, if N is an integer of 2 or larger, the driver circuit sequentially applies the touch panel scanning voltage to the divided counter electrodes of the respective blocks in N horizontal scanning periods while the scanning voltage and the video voltage are not varied,
wherein, in N horizontal scanning periods, the driver circuit outputs the scanning voltage periodically, and
wherein a drive frequency of the touch panel scanning voltage which is applied to the divided counter electrodes of the respective blocks in the respective periods of the N horizontal scanning periods is different in each of the N horizontal scanning periods.

2. The liquid crystal display device according to claim 1,
wherein the first substrate includes a plurality of video lines that input the video voltage to the respective pixels, and a plurality of scanning lines that input the scanning voltage to the respective pixels, and
wherein a period during which the scanning voltage and the video voltage are not varied is a period other than a voltage transition timing point of the video voltage on the video lines, a rising time point of the scanning voltage, or a falling time point of the scanning voltage.

3. A liquid crystal display device, comprising:
a first substrate;
a second substrate having detection electrodes of a touch panel;
a liquid crystal held between the first substrate and the second substrate;
a plurality of pixels arrayed in a matrix, each having a pixel electrode and a counter electrode divided into a plurality of blocks; and
a driver circuit that applies a counter voltage a scanning voltage, a video voltage and a touch panel scanning voltage to the divided counter electrodes of the respective blocks,
wherein the divided counter electrodes of the respective blocks are commonly provided on the respective pixels of a plurality of continuous display lines,
wherein the divided counter electrodes of the respective blocks double as scanning electrodes of the touch panel,
wherein, in respective horizontal scanning periods, the driver circuit outputs the scanning voltage, the video voltage and the touch panel scanning voltage,
wherein, if N is an integer of 2 or larger, the driver circuit sequentially applies the touch panel scanning voltage to the divided counter electrodes of the respective blocks in N horizontal scanning periods while the scanning voltage and the video voltage are not varied,
wherein, in N horizontal scanning periods, the driver circuit outputs the scanning voltage periodically, and
wherein timing at which the touch panel scanning voltage is applied to the divided counter electrodes of the respective blocks in the respective periods of the N horizontal scanning periods is different in each of the N horizontal scanning periods.

4. The liquid crystal display device according to claim 3,
wherein the first substrate includes a plurality of video lines that input the video voltage to the respective pixels, and a plurality of scanning lines that input the scanning voltage to the respective pixels, and
wherein a period during which the scanning voltage and the video voltage are not varied is a period other than a voltage transition timing point of the video voltage on the video lines, a rising time point of the scanning voltage, or a falling time point of the scanning voltage.

5. A liquid crystal display device, comprising:
a first substrate;
a second substrate having detection electrodes of a touch panel;
a liquid crystal held between the first substrate and the second substrate;
a plurality of pixels arrayed in a matrix, each having a pixel electrode and a counter electrode divided into a plurality of blocks; and
a driver circuit that applies a counter voltage, a scanning voltage, a video voltage and a touch panel scanning voltage to the divided counter electrodes of the respective blocks,
wherein the divided counter electrodes of the respective blocks are commonly provided on the respective pixels of a plurality of continuous display lines,
wherein the divided counter electrodes of the respective blocks double as scanning electrodes of the touch panel,
wherein, in respective horizontal scanning periods, the driver circuit outputs the scanning voltage, the video voltage and the touch panel scanning voltage,
wherein, if N is an integer of 2 or larger, the driver circuit sequentially applies the touch panel scanning voltage to the divided counter electrodes of the respective blocks in N horizontal scanning periods while the scanning voltage and the video voltage are not varied,
wherein, in N horizontal scanning periods, the driver circuit outputs the scanning voltage periodically, and wherein a period since a reference time point till a time point when the touch panel scanning voltage is applied to the divided counter electrodes of the respective blocks in the respective periods of the N horizontal scanning periods is different in each of the N horizontal scanning periods.

6. The liquid crystal display device according to claim 5, wherein the first substrate includes a plurality of scanning lines that input the scanning voltage to the respective pixels, and wherein the reference time point is one of a rising time point of the scanning voltage, and a falling time point of the scanning voltage.

7. The liquid crystal display device according to claim 5, wherein the first substrate includes a plurality of video lines that input the video voltage to the respective pixels, and a plurality of scanning lines that input the scanning voltage to the respective pixels, and wherein a period during which the scanning voltage and the video voltage are not varied is a period other than a voltage transition timing point of the video voltage on the video lines, a rising time point of the scanning voltage, or a falling time point of the scanning voltage.

8. A liquid crystal display device, comprising:

a first substrate;

a second substrate having detection electrodes of a touch panel;

a liquid crystal held between the first substrate and the second substrate;

a plurality of pixels arrayed in a matrix, each having a pixel electrode and a counter electrode divided into a plurality of blocks; and a driver circuit that applies a counter voltage, a scanning voltage, a video voltage and a touch panel scanning voltage to the divided counter electrodes of the respective blocks, wherein the divided counter electrodes of the respective blocks are commonly provided on the respective pixels of a plurality of continuous display lines, wherein the divided counter electrodes of the respective blocks double as scanning electrodes of the touch panel, wherein, in respective horizontal scanning periods, the driver circuit outputs the scanning voltage, the video voltage and the touch panel scanning voltage, wherein, if N is an integer of 2 or larger, the driver circuit sequentially applies the touch panel scanning voltage to the divided counter electrodes of the respective blocks in N horizontal scanning periods while the scanning voltage and the video voltage are not varied, wherein, in N horizontal scanning periods, the driver circuit outputs the scanning voltage periodically, and wherein when it is assumed that t_txdly is a unit delay time, t_txwait is a given wait time, n is an integer of 1 or larger and N or smaller, and delay=(n−1)×t_txdl is satisfied, the driver circuit applies the touch panel scanning voltage to the divided counter electrodes of the respective blocks after a period (t_txwait+delay) has been elapsed from a reference time point when applying the touch panel scanning voltage to the divided counter electrodes of the respective blocks in an n-th horizontal scanning period.

9. The liquid crystal display device according to claim 8, wherein the first substrate includes a plurality of scanning lines that input the scanning voltage to the respective pixels, and wherein the reference time point is one of a rising time point of the scanning voltage, and a falling time point of the scanning voltage.

10. The liquid crystal display device according to claim 8, wherein the driver circuit has a register in which the unit delay time (t_txdly) is stored.

11. The liquid crystal display device according to claim 8, wherein when it is assumed that t_txmaxd is a maximum delay time, if a delay time "delay" becomes t_txmaxd or larger, the delay time of "delay" is replaced with a delay time of (delay−(n−1)×t_txdly).

12. The liquid crystal display device according to claim 11, wherein the driver circuit has a register in which the maximum delay time (t_txmaxd) is stored.

13. The liquid crystal display device according to claim 8, wherein the driver circuit includes:

a sequencer;

a touch panel scanning voltage generator circuit that generates the touch panel scanning voltage under a control of the sequencer; and a delay circuit that delays the touch panel scanning voltage output from the touch panel scanning voltage generator circuit under the control of the sequencer by a desired delay time.

* * * * *